(12) United States Patent
Ukita et al.

(10) Patent No.: US 8,708,368 B2
(45) Date of Patent: Apr. 29, 2014

(54) GAS GENERATOR

(71) Applicant: Daicel Corporation, Osaka (JP)

(72) Inventors: Shinichiro Ukita, Tatsuno (JP); Teppei Hanano, Tatsuno (JP); Masayuki Yamazaki, Tatsuno (JP)

(73) Assignee: Daicel Corporation, Osaka (JP)

( * ) Notice: Subject to any disclaimer, the term of this patent is extended or adjusted under 35 U.S.C. 154(b) by 0 days.

(21) Appl. No.: 13/793,611

(22) Filed: Mar. 11, 2013

(65) Prior Publication Data

US 2013/0276660 A1  Oct. 24, 2013

Related U.S. Application Data

(60) Provisional application No. 61/638,444, filed on Apr. 25, 2012.

(30) Foreign Application Priority Data

Apr. 23, 2012 (JP) .................................. 2012-97283

(51) Int. Cl.
*B60R 21/26* (2011.01)
(52) U.S. Cl.
USPC ........................................................ 280/741
(58) Field of Classification Search
USPC ........................................ 280/741, 740, 742
See application file for complete search history.

(56) References Cited

U.S. PATENT DOCUMENTS 4,296,084 A   10/1981  Adams et al.
5,398,967 A *  3/1995  Carothers et al. ............. 280/741
5,458,371 A   10/1995  Fulmer et al.
5,582,427 A * 12/1996  Rink et al. ..................... 280/740
6,234,521 B1   5/2001  Katsuda et al.
8,083,256 B2* 12/2011  Yamazaki ...................... 280/736
2004/0226472 A1  11/2004  Oda
2005/0184497 A1*  8/2005  Miyaji et al. .................. 280/736
2006/0137786 A1*  6/2006  Yamazaki et al. .............. 149/22
2007/0001439 A1*  1/2007  Matsuda et al. ................ 280/741
2008/0118408 A1*  5/2008  Numoto et al. ................ 422/167
2009/0051152 A1   2/2009  Yamashita et al.
2011/0221175 A1   9/2011  Kobayashi et al.

FOREIGN PATENT DOCUMENTS

EP    0 359 407 A2   3/1990
JP    10-95303 A     4/1998
JP    2003-161599 A  6/2003
JP    2009-51236 A   3/2009

* cited by examiner

*Primary Examiner* — Faye M. Fleming
(74) *Attorney, Agent, or Firm* — Birch, Stewart, Kolasch & Birch, LLP

(57) ABSTRACT

The present invention provides a gas generator including a housing provided with a diffuser shell and a closure shell, an ignition device, the diffuser shell being in a substantially cup-like shape and having an annular bent portion obtained by bending a circumferential wall portion at an opening inwardly, the closure shell being in a substantially annular shape having a annular plate portion that includes a annular curved portion projecting toward the inside of the housing, the ignition device being fixed to a central hole in the annular plate portion with a resin, an inner circumferential part of the annular plate portion in the closure shell abutting against the resin, an outer circumferential part of the annular plate portion abutting against and being fixed to the annular bent portion of the diffuser shell.

16 Claims, 4 Drawing Sheets

GAS GENERATOR

This nonprovisional application claims priority under 35 U.S.C. §119(a) to Patent Application No. 2012-97283 filed in Japan on 23 Apr. 2012, and 35 U.S.C. §119(e) to U.S. Provisional Application No. 61/638,444 filed on 25 Apr. 2012, both of which are incorporated by reference.

BACKGROUND OF INVENTION

1. Field of Invention

The present invention relates to a gas generator for a restraining device such as an airbag system for a vehicle.

2. Description of Related Art

In a gas generator, an ignition device is actuated by an ignition current, and a gas generating agent disposed inside a housing is burned, or a pressurized gas charged therein is released, thereby generating gas.

In a pyrotechnic gas generator using a gas generating agent, the pressure is generated inside the housing during the actuation, and therefore the gas generator is designed with a tolerance for the generated pressure in order to prevent the housing from being damaged by the pressure. Accordingly, the parts are strongly joined together in the joint by welding or the like. As a result, air tightness of the joint is ensured and the generated gas does not leak from the joint during the actuation.

However, an equipment for conducting welding in industry is expensive and the number of process steps in the production line increases because the welding step is included. Further, in the case of conducting welding, welding heat is generated, and thermal insulation should be performed or parts should be added to prevent heat transfer to the gas generating agent or explosives located inside the housing.

In addition to welding, crimping is known as another method for fixing the housing. The crimping does not generate a large amount of heat and therefore erroneous ignition of the gas generating agent or explosives by heat is prevented. However, the crimping does not ensure a sufficient joining strength, compared to welding.

Another problem is that the sealing ability of the joint is insufficient.

In an inflator 100 shown in FIG. 1 of U.S. Pat. No. 5,458,371, a housing is formed by a combination of a diffuser cover 104 and an annular base 106.

The diffuser cover 104 is obtained by integrally forming a round top plate 110 and a tubular outer circumferential wall 112having a gas discharge hole 116 formed therein. The annular base 106 is a substantially round disk having an inner circumferential edge 106a and an outer circumferential edge 106b and is formed by complexly bending.

A lower end 112a of the tubular outer circumferential wall 112 is fixed by bending with respect to the annular base 106 (an outer circumferential edge 106b). The inner circumferential edge side of the annular base 106 is fixed by welding 146, but the circumferential edge side is not fixed by welding, as can be also confirmed by comparison with FIG. 2.

The annular base 106 has a substantially round disk shape, but is bent in a complex manner so as to project to the outside of the housing, and the outer circumferential edge 106b that is not fixed by welding is held by the crimped lower end portion 112a.

U.S. Pat. No. 4,296,084 discloses a gas generator 1 including a housing in which a diffuser housing 10 and a base 12 are joined by screws 18 and 20.

The central portion of the base 12 projects to the inside of the housing, and an adapter 42 having a squib 60 fixed thereto is attached to an opening in the central portion. Meanwhile, the screw 18 is formed in the outer circumferential edge of the base 12, and the base is deformed so as to project toward the outside of the housing at the outer circumferential edge.

SUMMARY OF INVENTION

The present invention, as a first aspect of the invention, provides a gas generator including a housing including a diffuser shell provided with a gas discharge port, and a closure shell, an ignition device including an igniter and a gas generating agent accommodated inside the housing, the diffuser shell being in a substantially cup-like shape and having an annular bent portion obtained by bending a circumferential wall portion at an opening inwardly, the closure shell being in a substantially annular shape having a annular plate portion, the annular plate portion having a annular curved portion projecting toward an inside of the housing, the ignition device being fixed to a central hole in the annular plate portion with a resin, an inner circumferential part of the annular plate portion in the closure shell abutting against the resin, and an outer circumferential part of the annular plate portion abutting against and being fixed to the annular bent portion of the diffuser shell.

The present invention, as a second aspect of the invention, provides a gas generator including a housing including a diffuser shell provided with a gas discharge port, and a closure shell, an ignition device including an igniter and a gas generating agent accommodated inside the housing, the diffuser shell being in a substantially cup-like shape and having an annular bent portion obtained by bending a circumferential wall portion at an opening inwardly, the closure shell being in a substantially annular shape having a annular plate portion, the annular plate portion having a annular curved portion projecting toward an inside of the housing, the ignition device being fixed to a central hole of the annular plate portion by a metallic collar, an inner circumferential part of the annular plate portion in the closure shell abutting against the metallic collar, an outer circumferential part of the annular plate portion abutting against and being fixed to the annular bent portion of the diffuser shell.

The present invention, as a third aspect of the invention, provides a gas generator including a housing including a diffuser shell provided with a gas discharge port, and a closure shell, an ignition device including an igniter and a gas generating agent accommodated inside the housing, the diffuser shell being in a substantially cup-like shape having a central hole for disposing the ignition device at a central portion of a bottom surface, and an annular bent portion obtained by bending a circumferential wall portion at an opening inwardly, the closure shell in a substantially annular shape curved toward the inside of the housing the ignition device being fixed to the central hole at the bottom surface of the diffuser shell with a resin or a metallic collar, an outer circumferential part of the closure shell abutting against and being fixed to the annular bent portion of the diffuser shell.

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

In such a structure as U.S. Pat. No. 5,458,371, that is, when a pressure is applied during the actuation, the outer circumferential edge 106b can be easily separated from the lower end portion 112a, and even if it does not come to separation, a gap is easily formed between the outer circumferential edge and the lower end portion, and the gas can leak through this gap.

In the structure disclosed in U.S. Pat. No. 4,296,084, since screws are used for joining, an accurate machining is required for producing the threaded grooves, the parts are difficult to machine, and the production itself is complex. Further, the outer circumferential edge side of the base 12 is deformed to project to the outside of the housing and there is still room for improvement in terms of pressure resistance ability of the entire base 12 in the case a pressure is generated inside the housing.

The present invention provides a gas generator having a housing of a specific structure that requires neither welding nor fastening with screws.

The present invention also provides a gas generator including a housing which is easily assembled. The housing is formed by a diffuser shell and a closure shell. The closure shell has a shape curved toward the inside of the housing, an outer circumferential part thereof is abutted against an annular bent portion of the diffuser shell. When the curved portion is pushed by pressure during actuation, the outer circumferential part is pressed against annular bent portion, thereby being more tightly in contact with each other.

In the gas generator in accordance with the present invention, when the diffuser shell and the closure shell are assembled and fixed to each other, none of such fixing means as welding as described in U.S. Pat. No. 5,458,371 or screws as described in U.S. Pat. No. 4,296,084, is required.

In the gas generator in accordance with the present invention, the inner circumferential part of the annular plate portion in the closure shell is abutted against the resin that fixes the ignition device, and the outer circumferential part of the annular plate portion in the closure shell is abutted against and fixed to the annular bent portion of the diffuser shell.

In order to obtain the configuration in which the outer circumferential part of the annular plate portion in the closure shell is abutted against and fixed to the annular bent portion of the diffuser shell, such a method is employed that the outer circumferential part of the annular plate portion in the closure shell is disposed to be abutted against the circumferential wall portion of the diffuser shell and then the circumferential wall portion in the vicinity of the opening of the diffuser shell is crimped (bent inward).

Figure 3:
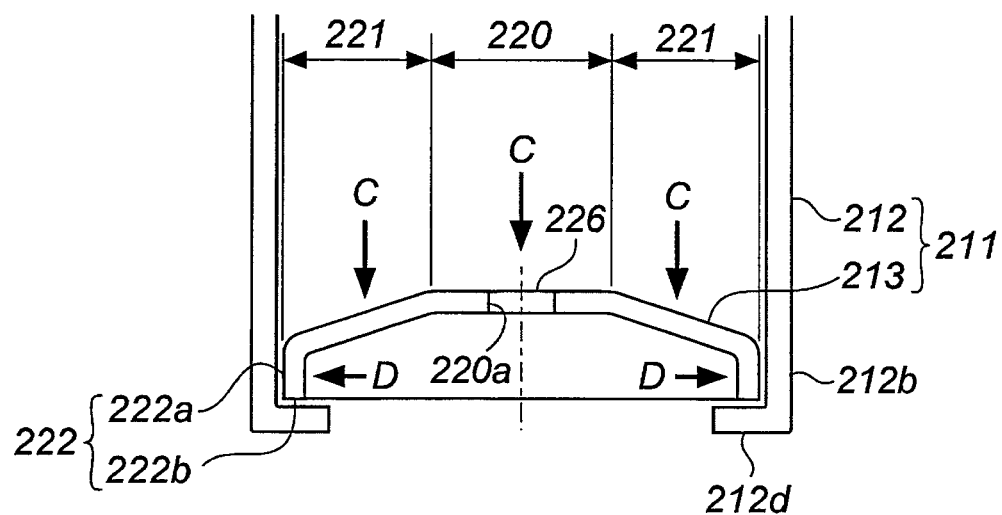
FIG. 3 is an axial partially sectional view of the gas generator of still another embodiment of the present invention.
Figure 4:
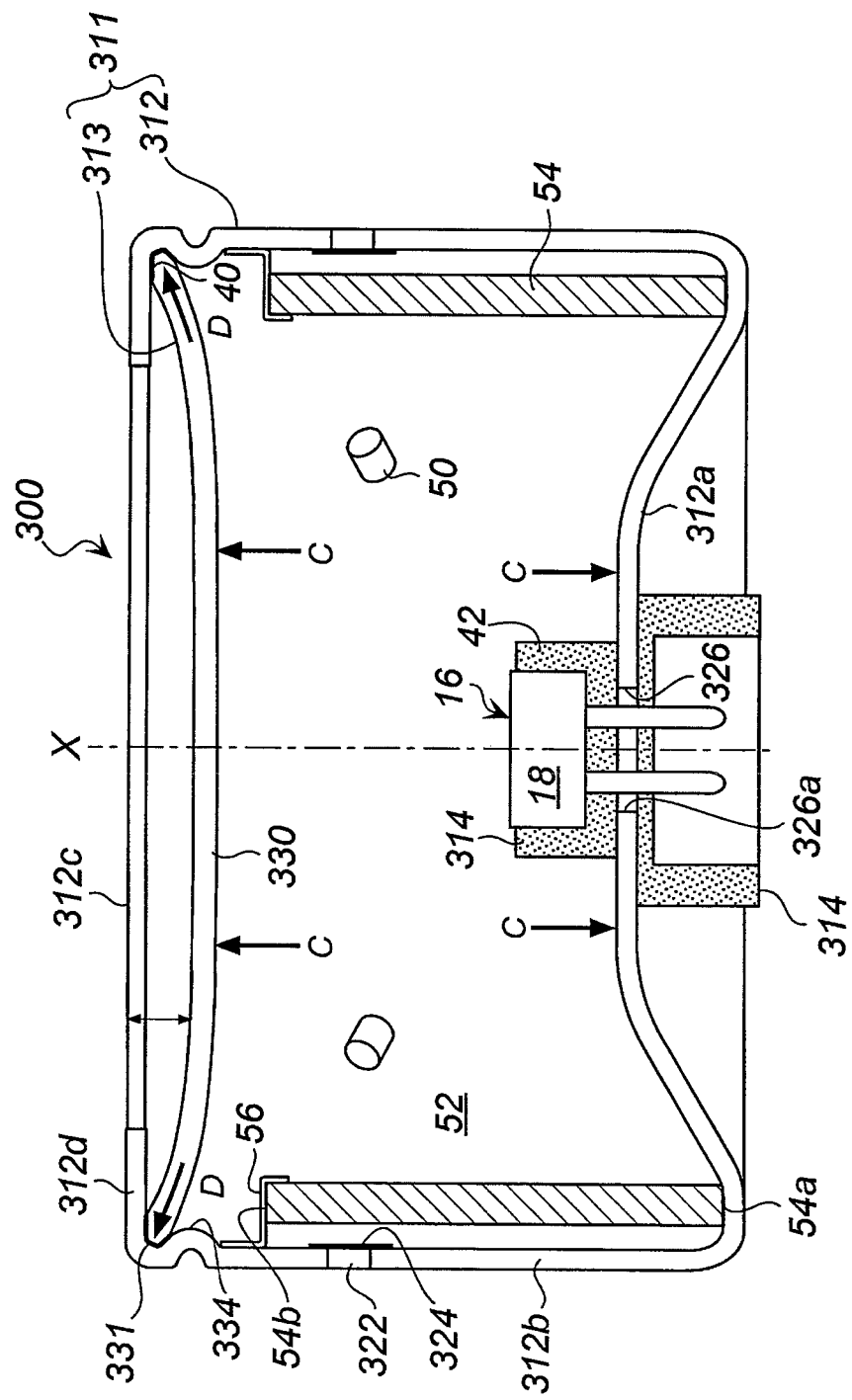
FIG. 4 is an axial sectional view of the gas generator of still another embodiment of the present invention.

For example, the crimping tool shown in FIGS. 3 and 4 of JP-A No. 2009-051236 can be used for the aforementioned crimping.

In the gas generator in accordance with the present invention, the annular plate portion of the closure shell has the annular curved portion projecting toward the inside of the housing, and high pressure resistance and air tightness during actuation can be maintained due to the below-described mechanism even without fixing means such as welding or screws.

When the pressure inside the housing rises during the actuation, a pressure is applied on the annular curved portion to the outside of the housing. In this case, the annular plate portion of the closure shell deforms slightly outward in the radial direction. However, in this case, the outer circumferential part of the annular plate portion is strongly pushed (strongly abutted) against the annular boundary section between the annular bent portion and the circumferential wall portion of the diffuser shell, and the deformation of the annular plate portion is also inhibited by this abutment.

Therefore, no gap appears in the abutment section between the outer circumferential part of the annular plate portion and the annular boundary section and high air tightness is maintained. Since the outer circumferential part of the annular plate portion thus abuts against the annular boundary section under the effect of the pressure and the annular curved portion has a convex shape projecting toward the inside of the housing, the closure shell demonstrates high pressure resistance. As a result, the closure shell is also prevented from deformation such as curving in the opposite direction (toward the outside of the housing) even when the pressure inside the housing rises during the actuation. The outer circumferential part of the annular plate portion may be abutted against the annular boundary section even before the actuation.

Further, the inner circumferential part of the annular plate portion is abutted against the resin that fixes the ignition device, and high air tightness is maintained, to the same degree as at the outer circumferential part side, by using a known sealing member.

Since the annular plate portion of the closure shell has an annular curved portion projecting toward the inside of the housing, the interference with a tool for crimping the circumferential wall near the opening of the diffuser shell is avoided and operability is improved comparing to that in the case without an existence of the annular curved portion.

Further, since the annular curved portion of the closure shell has a convex shape when viewed from the outside, a protruding degree of the connector at the portion protruding to the outside of the housing when a connector is connected to the ignition device is reduced and therefore the entirety of the gas generator can be reduced in size accordingly.

The closure shell has the annular plate portion, and the annular curved portion may be formed in part of the annular plate portion or the entire annular plate portion may have an annular curved shape. Further, the closure shell can have an annular plate portion and a cylindrical wall portion provided vertically toward the inside of the housing from an inner circumferential edge of the annular plate portion.

The closure shell may have an outer annular plate portion and an inner annular flat portion, and the outer annular plate portion, a cylindrical wall portion provided vertically from an inner circumferential edge of the outer annular plate portion, and moreover the inner annular flat portion extending inward from a circumferential edge of an opening of the cylindrical wall portion.

By using such a closure shell, it is possible to increase the contact surface area with the resin for fixing the ignition device.

In the first aspect of the invention, it is preferable that the closure shell has the annular plate portion and a cylindrical wall portion provided vertically toward the inside of the housing from an inner circumferential edge of the annular plate portion, the annular plate portion has the annular curved portion projecting toward the inside of the housing, and the cylindrical wall portion of the closure shell is abutted against the resin, and an outer circumferential part of the annular plate portion is abutted against and fixed to the annular bent portion of the diffuser shell.

In the first aspect of the invention, it is preferable that the closure shell has an outer annular plate portion, a cylindrical wall portion provided vertically from an inner circumferential edge of the outer annular plate portion, and an inner annular flat portion extending inward from a circumferential edge of an opening of the cylindrical wall portion, the outer annular plate portion has an annular curved portion projecting toward the inside of the housing, and the cylindrical wall portion and the inner annular flat portion of the closure shell are abutted against the resin, and the outer circumferential part of the outer annular plate portion is abutted against and fixed to the annular bent portion of the diffuser shell.

In the second aspect of the invention, the gas generator differs from the gas generator of the first aspect in that the ignition device is fixed with a metallic collar.

The closure shell has an annular plate portion, but can also have the annular plate portion and a cylindrical wall portion provided vertically toward the inside of the housing from the inner circumferential edge of the annular plate portion. The second aspect of the invention differs from the first aspect of the invention in terms of the fixing structure for a metallic igniter collar, but the structural mechanism ensuring air tightness of the housing when a pressure is applied to the closure shell is the same as in the first aspect and the effect obtained is also the same.

In the second aspect of the invention, it is preferable that the closure shell has the annular plate portion and a cylindrical wall portion provided vertically toward the inside of the housing from an inner circumferential edge of the annular plate portion, the annular plate portion has the annular curved portion projecting toward the inside of the housing, and the cylindrical wall portion of the closure shell is abutted against the metallic collar, and an outer circumferential part of the annular plate portion is abutted against and fixed to the annular bent portion of the diffuser shell.

In the first and second aspects of the invention, it is preferable that the diffuser shell has a protrusion protruding toward a central axis of the housing and provided in a circumferential wall portion at a position opposite to the annular bent portion, with respect to the outer circumferential part of the annular plate portion, and the outer circumferential part of the annular plate portion or the outer annular plate portion of the closure shell is abutted and fixed so as to be held from the thickness direction between the annular bent portion and the protrusion of the diffuser shell.

The protrusion may be a combination of a plurality of protrusions formed with equal spacing, or an annular protrusion.

The protrusion increases the joining strength of the diffuser shell and the closure shell.

The protrusion also facilitates the positioning of the closure shell with respect to the diffuser shell and facilitates the crimping operation.

In the first and second aspects of the invention, it is preferable that the closure shell is in a substantially annular shape and has, an annular flat portion having a central hole, an annular slant surface portion formed so as to descend from the annular flat portion toward the outer circumferential part, and a cylindrical wall surface portion formed by bending toward the outside of the housing at the annular slant surface portion, and an inner circumferential edge of the central hole of the closure shell is abutted against the resin or the metallic collar, an outer circumferential surface of the cylindrical wall surface portion is abutted against the circumferential wall portion of the diffuser shell, and an annular end surface of the cylindrical wall surface portion is abutted against and fixed to the annular bent portion.

By using such a closure shell, it is possible to increase the contact surface area of the closure shell and diffuser shell. Therefore, sealing ability therebetween is further increased.

In the gas generator in accordance with the present invention, when the diffuser shell and the closure shell are assembled and fixed to each other, none of such fixing means as welding as described in U.S. Pat. No. 5,458,371 or screws as described in U.S. Pat. No. 4,296,084, is required, like the gas generator according to the first aspect of the invention described hereinabove.

The main difference between the gas generator in accordance with the present invention and the gas generator according to the first aspect of the invention is in the structure of the diffuser shell and the closure shell, with respect to an attachment position of the ignition device.

In the gas generator in accordance with the present invention, the outer circumferential part of the closure shell of a substantially plate-like shape is abutted against and fixed to the annular bent portion of the diffuser shell. The closure shell of a substantially plate-like shape is curved toward the inside of the housing (has a convex shape projecting toward the inside of the housing).

In order to obtain the configuration in which the outer circumferential part of the closure shell of a substantially plate-like shape is abutted against and fixed to the annular bent portion of the diffuser shell, such a method is employed that the outer circumferential part of the closure shell is disposed so as to be abutted inside the diffuser shell, and the circumferential wall portion in the vicinity of the opening is crimped (bend inward).

For example, the crimping tool shown in FIGS. 3 and 4 of JP-A No. 2009-051236 can be used for the aforementioned crimping.

In the gas generator in accordance with the present invention, the substantially plate-like closure shell is in a shape curved toward the inside of the housing (a shape having a curved portion), and high air tightness during actuation is maintained due to the below-described mechanism even without using fixing means such as welding or screws.

When the pressure inside the housing rises during the actuation, a pressure is applied on the curved portion to the outside of the housing. In this case, the closure shell deforms slightly outward in the radial direction. However, in this case, the outer circumferential part of the closure shell is strongly pushed (strongly abutted) against the annular boundary section between the annular bent portion and the circumferential wall portion of the diffuser shell, and the deformation of the closure shell is also inhibited by this abutment.

Therefore, no gap appears in the abutment section between the outer circumferential part of the closure shell and the annular boundary section and high air tightness is maintained.

Since the outer circumferential part of the closure shell thus abuts against the annular boundary section under the effect of the pressure and the curved portion has a convex shape projecting toward the inside of the housing, the closure shell demonstrates high pressure resistance. As a result, the closure shell is also prevented from deformation such as curving in the opposite direction (toward the outside of the housing) even when the pressure inside the housing rises during the actuation. The outer circumferential part of the annular plate portion may be abutted against the annular boundary section even before the actuation.

Further, since the closure shell is curved toward the inside of the housing, the interference with a tool for crimping the circumferential wall near the opening of the diffuser shell is avoided and operability is improved comparing to that in the case without an existence of the curved portion.

In the gas generator in accordance with the present invention, the bottom surface of the diffuser shell can be shaped to curve toward the inside of the housing from the outer circumferential portion toward the hole formed in the central portion.

With such a shape, a protruding degree of the connector at the portion protruding to the outside of the housing when a connector is connected to the ignition device is reduced and therefore the entire gas generator can be reduced in size accordingly.

In the third aspect of the invention, it is preferable that the bottom surface of the diffuser shell has a shape curved toward the inside of the housing from the outer circumferential wall portion toward the hole formed in the central portion.

In the third aspect of the invention, it is preferable that the diffuser shell has a protrusion protruding toward a central axis of the housing and provided in a circumferential wall portion at a position opposite to the annular bent portion, with respect to the outer circumferential part of the closure shell, and the outer circumferential part of the closure shell is abutted and fixed so as to be held from the thickness direction between the annular bent portion and the protrusion of the diffuser shell.

In the first, second and third aspects of the invention, it is preferable that the closure shell and the diffuser shell are abutted against each other, with a sealing member being interposed therebetween.

The protrusion may be a combination of a plurality of protrusions formed with equal spacing, or an annular protrusion.

The protrusion increases the joining strength of the diffuser shell and closure shell.

The protrusion also facilitates the positioning of the closure shell with respect to the diffuser shell and facilitates the crimping operation.

In the above-described inventions, the closure shell and the diffuser shell can be abutted against each other, with a sealing member being interposed therebetween.

A conventional gasket, O-ring, or packing can be placed, or a liquid or gel-like sealing agent can be coated as the sealing member.

In the gas generator in accordance with the present invention, the closure shell is shaped to curve toward the inside of the housing. Therefore, the outer circumferential part of the closure shell is strongly abutted against the diffuser shell by the pressure acting during the actuation, and the pressure resistance of the closure shell itself and the sealing ability of the abutment section thereof are increased. Therefore, the conventional welding or fastening with screws is not required when the housing is assembled and therefore the manufacturing process is facilitated.

Figure 1:
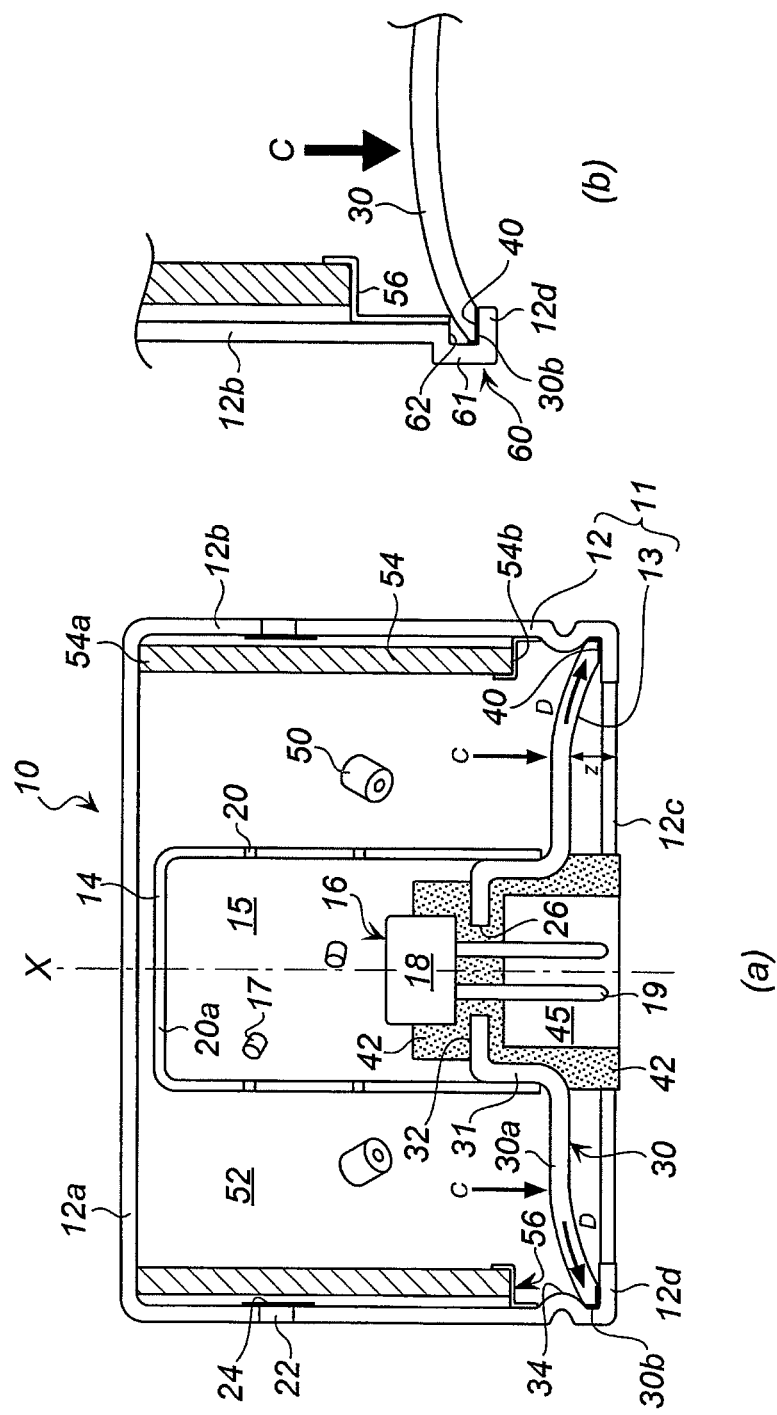
FIG. 1 shows, in (a), an axial sectional view of the gas generator of the present invention, and, in (b), a partial sectional view of another embodiment.

Embodiments of Invention (1) Gas Generator Shown in (a) in FIG. 1

A gas generator 10 has a housing 11 formed by a diffuser shell 12 and a closure shell 13.

A cup-shaped container 14 is disposed inside the hosing 11, and the interior of the cup-shaped container serves as an ignition device chamber 15.

An igniter 16 serving as an ignition device and a gas generating agent 17 serving as a transfer charge are disposed in the ignition device chamber 15. The igniter 16 is a known electric igniter and has conductive pin 19 extending from an ignition portion 18.

The diffuser shell 12 is of a substantially cup-like shape and has a bottom surface portion 12a and a circumferential wall portion 12b.

A plurality of gas discharge ports 22 are formed equidistantly in the circumferential direction in the circumferential wall portion 12b. The gas discharge ports are closed from the inside with a seal tape 24.

The diffuser shell 12 has an annular bent portion 12d obtained by bending inward the circumferential wall portion 12b at an opening 12c.

The diffuser shell 12 also has a plurality of protrusions 34 protruding toward the central axis X of the housing in the circumferential wall portion 12b. The protrusions are positioned in a side of the bottom surface portion 12a with respect to the annular bent portion 12d.

The protrusions 34 are formed equidistantly in the circumferential direction, and about 4 to 20 protrusions can be formed.

The protrusions 34 protrude toward the central axis X of the housing (toward the inside of the housing), but a structure having an annular step portion 60, which is shown in (b) in FIG. 1 can be also used instead of the protrusions 34.

The annular step portion 60 has an enlarged diameter portion 61 that is obtained by enlarging outwardly a part of the circumferential wall portion 12b in the opening 12c side and a step surface 62 that is directly opposite to the annular bent portion 12d in the axis X direction.

The closure shell 13 is of a substantially annular shape. In the embodiment illustrated by FIG. 1, the closure shell 13 has a cylindrical wall portion 31 provided vertically from an inner circumferential edge of an outer annular plate portion 30, and an inner annular flat portion 32 extending inwardly from a circumferential edge the opening of the cylindrical wall portion 31.

The entire outer annular plate portion 30 is in the form of an annular curved portion (an annular convex section projecting inwardly of the housing 11) 30a curved to the inside of the housing 11.

The igniter 16 is attached in a central hole 26 formed in the center of the closure shell 13 (in the inner annular flat portion 32) with a resin 42.

Almost all the portion of the inner annular flat portion 32 is embedded in the resin 42, and the inner circumferential surface of the cylindrical wall portion 31 is tightly attached to the resin 42.

An outer circumferential part 30b of the outer annular plate portion 30 is abutted and fixed so as to be inserted in the thickness direction between the annular bent portion 12d and the protrusions 34, with a sealing member 40 being interposed therebetween.

When the housing having the annular step portion 60 shown in FIG. 1(b) is used, the outer circumferential part 30b of the outer annular plate portion 30 is abutted and fixed to the area defined by the annular bent portion 12d, the inner circumferential surface of the enlarged diameter portion 61, and the step surface 62, with the sealing member 40 being interposed therebetween.

The cup-shaped container 14 is fitted to the cylindrical wall portion 31 of the closure shell 13 and fixed thereto.

A gap is formed between the bottom surface 20*a* and the bottom surface portion 12*a* of the diffuser shell.

The cup-shaped container 14 has a plurality of nozzles 20 in the circumferential wall portion. The nozzles 20 are formed equidistantly in the circumferential direction and closed with a seal tape or the like from the outside prior to actuation.

A cylindrical filter 54 is disposed inside the housing 11 such that a gap is formed between the cylindrical filter and the gas discharge ports 22.

The cylindrical filter 54 is abutted at one end surface 54*a* thereof against the bottom surface portion 12*a* of the diffuser shell and supported at the other end surface 54*b* thereof by an annular retainer 56.

The annular retainer 56 is fixed by press-fitting against the circumferential wall portion 12*b* of the diffuser shell 12.

In (a) in FIG. 1, a part of the annular retainer 56 is fixed in a state of abutment against the protrusions 34, but the fixing position of the annular retainer 56 is adjusted according to the size of the cylindrical filter 54.

In (b) in FIG. 1, a part of the annular retainer 56 is abutted against the outer circumferential part 30*b* of the outer annular plate portion 30, but the fixing position of the annular retainer 56 is adjusted according to the size of the cylindrical filer 54.

The space between the cup-shaped container 14 and the cylindrical filter 54 is a combustion chamber 52 that is charged with a gas generating agent 50.

An example of a method for assembling the gas generator 10 shown in FIG. 1 will be explained below.

The closure shell 13 and the igniter 16 are disposed inside a predetermined mold and the resin is injection-molded, thereby fixing the igniter 16 to the closure shell 13 by the resin 42. The cup-shaped container 14 charged with a gas generating agent 17 is then assembled and attached to the closure shell 13.

The cylindrical filter 54 is then attached inside the diffuser shell 11 by using the retainer 56.

A plurality of protrusions 34 are then formed in the circumferential wall portion 12*b* of the diffuser shell 12. The cylindrical filter 54 can be also attached using the retainer 56 after a plurality of protrusions 34 have been formed in advance, provided that the operations of attaching the cylindrical filter 54 and the retainer 56 are not impeded.

The closure shell 13 (with the ignition device fixed thereto) is then disposed such that the outer circumferential part 30*b* thereof is abutted against the circumferential wall portion 12*b* in the vicinity of the opening 12*c* of the diffuser shell 12. In this case, the sealing member 40 is arranged in advance.

The circumferential wall portion 12*b* in the vicinity of the opening 12*c* of the diffuser shell 12 is then crimped and deformed as shown in FIG. 1 to form the annular bent portion 12*d*.

In this case, the outer circumferential part 30*b* of the closure shell 13 is fixed so as to be sandwiched from both sides in the thickness direction by the annular bent portion 12*d* and the plurality of protrusions 34.

As shown in FIG. 1, the closure shell 13 has the annular curved portion 30*a*, whereby a clearance Z is generated between the annular bent portion 12*d* and the annular curved portion 30*a*. Due to the presence of the clearance Z, the crimping tool can be prevented from coming into contact with the closure shell 13 (in particular, the outer annular plate portion 30), and the crimping process is improved.

Further, as shown in FIG. 1, due to the presence of the clearance Z, a protruding degree of the resin 42 (forms a connector connection space 45) that protrudes from the lower end surface of the annular bent portion 12*d* is decreased and therefore an entirety of gas generator 10 can be reduced in size.

The operation of the gas generator 10 shown in FIG. 1 is explained below.

Where an ignition current is supplied to the igniter 16, an ignition agent loaded into the ignition portion 18 is burned and the gas generating agent (a transfer charge) 17 located in the ignition device chamber 15 is burned. The combustion products are supplied from the nozzles 20 into the combustion chamber 52, and the gas generating agent 50 is ignited. After the combustion of the gas generating agent 50 has been started, the pressure inside the housing 11 rises due to the combustion gas generated as a result of this combustion.

In this case, all surfaces inside the housing 11 receive the pressure. In particular, the closure shell 13 receives the pressure in the direction shown by an arrow C in FIG. 1 and whereby deforms towards the outside of the housing 11.

However, in the gas generator 10, since the outer annular plate portion 30 of the closure shell 13 has the curved portion 30*a*, where the pressure is applied in the direction shown by the arrow C, a radial outward force (arrow D) is generated in the outer circumferential part 30*b*. In addition, by means of the pressure (as indicated by the arrow C) a force also is applied on the closure shell itself in the direction of the opening 12*c* side, and the outer circumferential part 30*b* abuts against the annular boundary section formed between the annular bent portion 12*d* and the circumferential wall portion 12*b*.

When the force acts in the direction of the arrow D, a force is applied such that the outer circumferential part 30*b* of the outer annular plate portion 30 pushes the abutment section between the annular bent portion 12*d* and the protrusions 34. Therefore, the outer circumferential part 30*b* is strongly pressed against the abutment section. However, further deformation is prevented (deformation of the annular curved portion 30*a* toward the outside of the housing), and pressure resistance of the closure shell is ensured. Further, the combustion gas does not leak from the abutment section.

Figure 2:
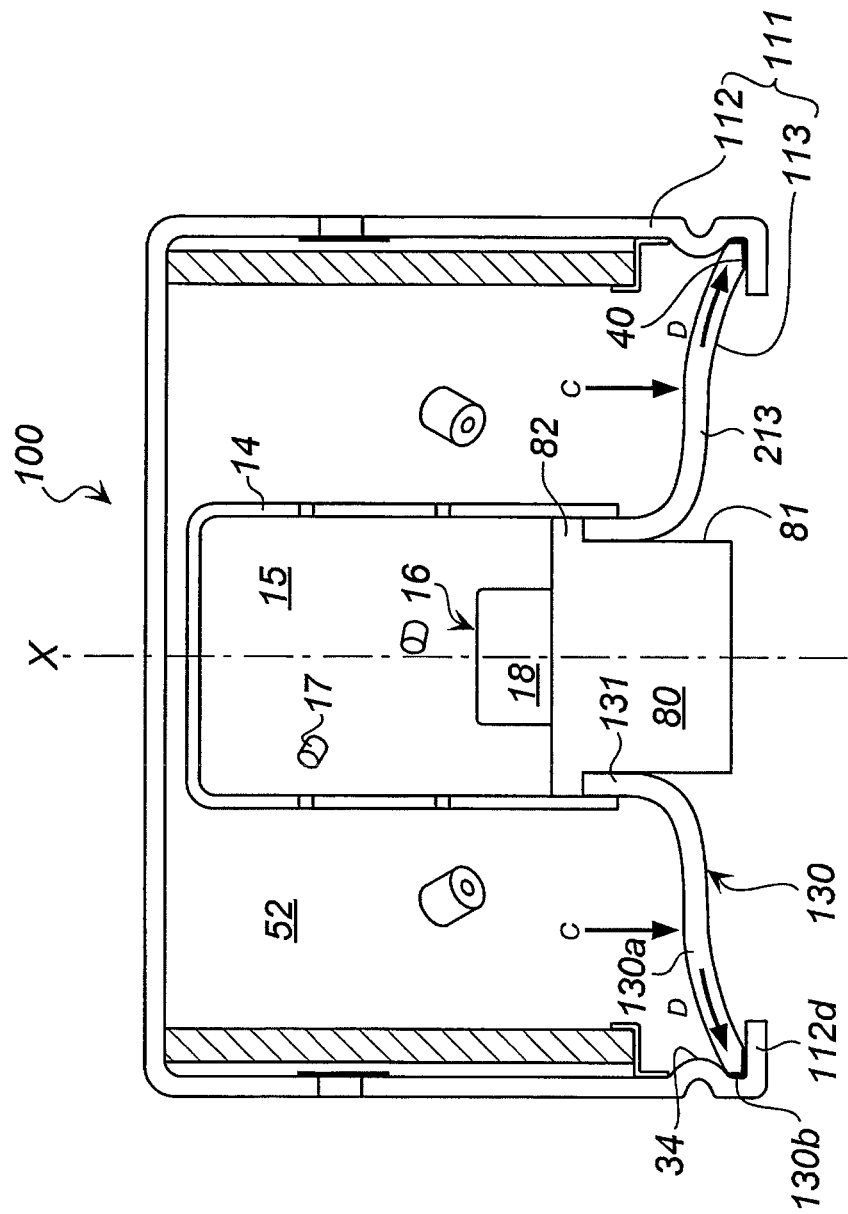
FIG. 2 shows an axial sectional view of the gas generator of another embodiment of the present invention.

(2) Gas Generator Shown in FIG. 2

A gas generator 100 differs from the gas generator 10 shown in FIG. 1 in the structure of a closure shell 113 and the attachment of the closure shell 113 and the igniter 16.

The closure shell 113 is of a substantially annular shape and has an annular plate portion 130 and a cylindrical wall portion 131 provided vertically from the inner circumferential edge of the annular plate portion 130.

The annular plate portion 130 has an annular curved portion (an annular convex section projecting to the inside of a housing 111) 130*a* projecting to the inside of the housing 111.

An outer circumferential part 130*b* of the annular plate portion 130 is abutted and fixed so as to be held in the thickness direction between an annular bent portion 112*d* and the protrusions 34, with the sealing member 40 being interposed therebetween.

As for the igniter 16, the igniter 16 is fixed to a metallic igniter collar 80.

For example, the assembly in which the igniter main body is integrated with the collar by a resin, as shown in FIG. 1 of JP-A No. 2003-161599, or the assembly in which part of the collar is crimped to fix the igniter main body, as shown in FIG. 10 of JP-A No. 10-95303 can be used.

The igniter collar 80 has a circumferential wall surface 81 and a flange 82 protruding radially from an end of the circumferential wall surface 81.

The igniter collar 80 (the igniter 16) is fitted such that the circumferential wall surface 81 and the flange 82 of the igniter collar 80 are abutted against the cylindrical wall portion 131 of the closure shell. Crimping or welding are suitable as methods for fixing the igniter collar 80 and the closure shell 113. Since the welding is performed before the gas generating agent is charged, no thermal effect is produced thereon.

In the gas generator 100 shown in FIG. 2, during actuation, the pressure is applied in the direction of the arrow C, in the same manner as in the gas generator 10 shown in FIG. 1, a force in the direction of the arrow D is thereby generated, and the operation proceeds in the same manner as in the case of the gas generator 10 shown in FIG. 1.

(3) Gas Generator Shown in FIG. 3

FIG. 3 is a partial sectional view of a gas generator. The shape of closure shell is different from that in the gas generator 10 shown in FIG. 1.

A housing 211 has a diffuser shell 212 and a closure shell 213.

The closure shell 213 has an annular flat portion 220 having a central hole 226, an annular slant surface portion 221 formed so as to descend from the annular flat portion 220 towards the outer circumferential part of the housing, and a cylindrical wall surface portion 222 formed by bending toward the outside of the housing at the annular slant surface portion 221.

The igniter is attached with a resin to the central hole 226 in the same manner as shown in FIG. 1. A metallic igniter collar may be used in the same manner as in the gas generator 100 shown in FIG. 2.

An inner circumferential edge 220a of the central hole 226 is abutted against or embedded in the resin.

An outer circumferential surface 222a of the cylindrical wall surface portion 222 is abutted against the circumferential wall portion 212b of the diffuser shell 212, and an annular end surface 222b of the cylindrical wall surface portion 222 is abutted against and fixed to the annular bent portion 212d.

The protrusions 34 shown in FIGS. 1 and 2 can be also formed in the gas generator shown in FIG. 3.

When the gas generator shown in FIG. 3 is actuated, and a pressure is applied as shown by an arrow C, a force acts, toward the annular bent portion 212d, on the entire closure shell 213, and also a force acts in the direction of an arrow D (radially outward).

As a result, the outer circumferential surface 222a and the annular end surface 222b of the cylindrical wall surface portion 222 are pressed against the respective abutment sections, thereby preventing the combustion gas from leaking from the abutment sections. In particular, since the outer circumferential edge of the annular end surface 222b is strongly abutted against the annular boundary section formed between the circumferential wall portion 212b and the annular bent portion 212d of the diffuser shell 212, the closure shell 213 is also prevented from deforming toward the outside of the housing 211.

In the embodiment illustrated by FIG. 3, the surface area of the abutment section of the diffuser shell 212 and the closure shell 213 is increased comparing to that in the gas generators shown in FIGS. 1 and 2, and therefore the effect of preventing the combustion gas from leaking from the abutment section is further enhanced.

(4) Gas Generator Shown in FIG. 4

A gas generator 300 has a housing 311 having a diffuser shell 312 and a closure shell 313.

The diffuser shell 312 is of a substantially cup-like shape and has a bottom surface portion 312a and a circumferential wall portion 312b.

A plurality of gas discharge ports 322 are formed equidistantly in the circumferential direction in the circumferential wall portion 312b. The gas discharge ports are closed from the inside with a seal tape 324.

A hole (a central hole) 326 is formed in the central section of a bottom surface portion 312a, and the bottom surface portion 312a has a shape curving toward the inside of the housing from the outer circumference (the circumferential wall portion 312b) toward the hole 326 formed in the central section.

Similarly to the gas generator 10 shown in FIG. 1, the igniter 16 is attached with a resin 314. An inner circumferential edge 326a of the hole 326 is abutted against or embedded in the resin 314.

Since the degree of concavity of the bottom surface portion 312a is the largest in the portion where the hole 326 is provided, a protruding degree of the resin 314, that protrudes from the lower end surface of the diffuser shell 312, is decreased.

The diffuser shell 312 has an annular bent portion 312d that is obtained by bending inward the circumferential wall portion 312b at the opening 312c.

Further, the diffuser shell 312 has a plurality of protrusions 334 protruding toward the central axis X of the housing at the circumferential wall portion 312b. The protrusions are positioned in a side of the bottom surface portion 312a with respect to the annular bent portion 312d.

The protrusions 334 are formed equidistantly in the circumferential direction. About 4 to 20 protrusions can be formed.

The closure shell 313 has a substantially plate-like shape that is curved toward the inside of the housing 310 (has a curved portion 330).

The outer circumferential part 331 of the closure shell 313 is abutted and fixed so as to be held in the thickness direction between the annular bent portion 312d and the protrusions 334, with a sealing member being interposed therebetween.

A cylindrical filter 54 is disposed inside the housing 311 such that a gap is formed between the cylindrical filter and the gas discharge ports 322.

The cylindrical filter 54 is abutted at one end surface 54a against the bottom surface portion 312a of the diffuser shell and supported at the other end surface 54b by the annular retainer 56.

The annular retainer 56 is fixed by pressing against the circumferential wall portion 312b of the diffuser shell. In FIG. 4, part of the annular retainer 56 is fixed by abutting against the protrusions 334, but the fixing position of the annular retainer 56 is adjusted according to the size of the cylindrical filter 54.

The interior of the cylindrical filter 54 is the combustion chamber 52, and the gas generating agent 50 is charged therein.

The operation of the gas generator 300 shown in FIG. 4 is explained below.

When an ignition current is supplied to the igniter 16 to burn an ignition agent, the gas generating agent 50 charged in the combustion chamber 52 is burned. The pressure inside the housing 311 rises due to the generated combustion gas.

In this case, all surfaces inside the housing 311 receive the pressure. The closure shell 313 receives the pressure in the direction shown by an arrow C and deforms toward the outside of the housing 311. Therefore, the outer circumferential part 331 of the closure shell 313 is strongly abutted against the annular boundary section formed between the circumferential wall portion 312b and the annular bent portion 312d of the diffuser shell 312.

Further, in the gas generator 300, since the closure shell 313 has the curved portion 330, where a pressure is applied in the direction shown by the arrow C, a force acts radially outward on the outer circumferential part 331 (in the direction of the arrow D).

Since the outer circumferential part 331 is strongly pushed against the annular boundary section, the closure shell 313 is prevented from further deformation. The combustion gas is also prevented from leaking in the abutment section. Further, the igniter 16 may be also fixed to the closure shell 313 by using the igniter collar 80 such as shown in FIG. 2.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising,
a housing including a diffuser shell provided with a gas discharge port, and a closure shell,
an ignition device including an igniter and a gas generating agent accommodated inside the housing,
the diffuser shell being in a substantially cup-like shape and having an annular bent portion obtained by bending a circumferential wall portion at an opening inwardly,
the closure shell being in a substantially annular shape having a annular plate portion, the annular plate portion having a annular curved portion projecting toward an inside of the housing,
the ignition device being fixed to a central hole in the annular plate portion with a resin,
an inner circumferential part of the annular plate portion in the closure shell abutting against the resin, and
an outer circumferential part of the annular plate portion abutting against and being fixed to the annular bent portion of the diffuser shell.

2. The gas generator according to claim 1, wherein
the closure shell has the annular plate portion and a cylindrical wall portion provided vertically toward the inside of the housing from an inner circumferential edge of the annular plate portion,
the annular plate portion has the annular curved portion projecting toward the inside of the housing, and
the cylindrical wall portion of the closure shell is abutted against the resin, and an outer circumferential part of the annular plate portion is abutted against and fixed to the annular bent portion of the diffuser shell.

3. The gas generator according to claim 1, wherein
the closure shell has an outer annular plate portion, a cylindrical wall portion provided vertically from an inner circumferential edge of the outer annular plate portion, and an inner annular flat portion extending inward from a circumferential edge of an opening of the cylindrical wall portion,
the outer annular plate portion has an annular curved portion projecting toward the inside of the housing, and
the cylindrical wall portion and the inner annular flat portion of the closure shell are abutted against the resin, and the outer circumferential part of the outer annular plate portion is abutted against and fixed to the annular bent portion of the diffuser shell.

4. A gas generator comprising,
a housing including a diffuser shell provided with a gas discharge port, and a closure shell,
an ignition device including an igniter and a gas generating agent accommodated inside the housing,
the diffuser shell being in a substantially cup-like shape and having an annular bent portion obtained by bending a circumferential wall portion at an opening inwardly,
the closure shell being in a substantially annular shape having a annular plate portion, the annular plate portion having a annular curved portion projecting toward an inside of the housing,
the ignition device being fixed to a central hole of the annular plate portion by a metallic collar,
an inner circumferential part of the annular plate portion in the closure shell abutting against the metallic collar, an outer circumferential part of the annular plate portion abutting against and being fixed to the annular bent portion of the diffuser shell.

5. The gas generator according to claim 4, wherein
the closure shell has the annular plate portion and a cylindrical wall portion provided vertically toward the inside of the housing from an inner circumferential edge of the annular plate portion,
the annular plate portion has the annular curved portion projecting toward the inside of the housing, and
the cylindrical wall portion of the closure shell is abutted against the metallic collar, and an outer circumferential part of the annular plate portion is abutted against and fixed to the annular bent portion of the diffuser shell.

6. The gas generator according to claim 1, wherein
the diffuser shell has a protrusion protruding toward a central axis of the housing and provided in a circumferential wall portion at a position opposite to the annular bent portion, with respect to the outer circumferential part of the annular plate portion, and
the outer circumferential part of the annular plate portion of the closure shell is abutted and fixed so as to be held from the thickness direction between the annular bent portion and the protrusion of the diffuser shell.

7. The gas generator according to claim 1, wherein
the closure shell is in a substantially annular shape and has,
an annular flat portion having a central hole,
an annular slant surface portion formed so as to descend from the annular flat portion toward the outer circumferential part, and
a cylindrical wall surface portion formed by bending toward the outside of the housing at the annular slant surface portion, and
an inner circumferential edge of the central hole of the closure shell is abutted against the resin or the metallic collar, an outer circumferential surface of the cylindrical wall surface portion is abutted against the circumferential wall portion of the diffuser shell, and an annular end surface of the cylindrical wall surface portion is abutted against and fixed to the annular bent portion.

8. A gas generator comprising,
a housing including a diffuser shell provided with a gas discharge port, and a closure shell,
an ignition device including an igniter and a gas generating agent accommodated inside the housing,
the diffuser shell being in a substantially cup-like shape having a central hole for disposing the ignition device at a central portion of a bottom surface, and an annular bent portion obtained by bending a circumferential wall portion at an opening inwardly,
the closure shell in a substantially annular shape curved toward the inside of the housing the ignition device being fixed to the central hole at the bottom surface of the diffuser shell with a resin or a metallic collar, an outer circumferential part of the closure shell abutting against and being fixed to the annular bent portion of the diffuser shell.

9. The gas generator according to claim 8, wherein the bottom surface of the diffuser shell has a shape curved toward the inside of the housing from the outer circumferential wall portion toward the central hole formed in the central portion.

10. The gas generator according to claim 8, wherein the diffuser shell has a protrusion protruding toward a central axis of the housing and provided in a circumferential wall portion at a position opposite to the annular bent portion, with respect to the outer circumferential part of the closure shell, and the outer circumferential part of the closure shell is abutted and fixed so as to be held from the thickness direction between the annular bent portion and the protrusion of the diffuser shell.

11. The gas generator according to claim 1, wherein the closure shell and the diffuser shell are abutted against each other, with a sealing member being interposed therebetween.

12. The gas generator according to claim 4, wherein the diffuser shell has a protrusion protruding toward a central axis of the housing and provided in a circumferential wall portion at a position opposite to the annular bent portion, with respect to the outer circumferential part of the annular plate portion, and the outer circumferential part of the annular plate portion of the closure shell is abutted and fixed so as to be held from the thickness direction between the annular bent portion and the protrusion of the diffuser shell.

13. The gas generator according to claim 4, wherein the closure shell is in a substantially annular shape and has, an annular flat portion having a central hole, an annular slant surface portion formed so as to descend from the annular flat portion toward the outer circumferential part, and a cylindrical wall surface portion formed by bending toward the outside of the housing at the annular slant surface portion, and an inner circumferential edge of the central hole of the closure shell is abutted against the metallic collar, an outer circumferential surface of the cylindrical wall surface portion is abutted against the circumferential wall portion of the diffuser shell, and an annular end surface of the cylindrical wall surface portion is abutted against and fixed to the annular bent portion.

14. The gas generator according to claim 4, wherein the closure shell and the diffuser shell are abutted against each other, with a sealing member being interposed therebetween.

15. The gas generator according to claim 8, wherein the closure shell and the diffuser shell are abutted against each other, with a sealing member being interposed therebetween.

16. The gas generator according to claim 1, wherein the closure shell is formed of a single part.

* * * * *